United States Patent [19]

Shimomura

[11] 3,978,326
[45] Aug. 31, 1976

[54] DIGITAL POLYNOMIAL FUNCTION GENERATOR

[76] Inventor: Naonobu Shimomura, No. 13-8, Sakuragaoka-cho, Shibuya, Tokyo, Japan

[22] Filed: Dec. 18, 1975

[21] Appl. No.: 641,950

[30] Foreign Application Priority Data
Dec. 27, 1974 Japan.................................. 50-655

[52] U.S. Cl............................... 235/152; 235/197
[51] Int. Cl.²......................................... G06F 15/34
[58] Field of Search..................... 235/152, 156, 197

[56] References Cited
UNITED STATES PATENTS

| | | | |
|---|---|---|---|
| 3,818,202 | 6/1974 | Ellison | 235/156 |
| 3,843,872 | 10/1974 | Shimomura | 235/197 X |
| 3,922,536 | 11/1975 | Hampel et al. | 235/152 |

Primary Examiner—Jerry Smith
Attorney, Agent, or Firm—Staas & Halsey

[57] ABSTRACT

Apparatus for obtaining a numerical value of a polynomial function of a variable. The method of cascade accumulation is used in which memories M0, M1, M2, ..., Mn are involved, and under one cycle of manipulation, the content of memory M1 is added to the content of M0, the content of M2 is added to the content of M1, and so on until the content of Mn is added to the content of Mn−1. By loading a digital value determined by the coefficients of the polynomial $a_0, a_1, a_2, \ldots, a_n$ in each of the memories as its initial value, and repeating x cycles of the above mentioned manipulations, the digital value of the function $$w = a_0 + a_1 x + a_2 x^2 + \ldots + a_n x^n$$

is obtained in the memory M0.

A simplified electrical circuit for performing the above manipulation is disclosed, in one example of which only memories or a shift register and an adder are involved as key elements in the logic circuit to generate a polynomial function, and no complicated programming is needed.

5 Claims, 7 Drawing Figures

DIGITAL POLYNOMIAL FUNCTION GENERATOR

BACKGROUND OF THE INVENTION

1. Field of the Invention

This invention relates to a simplified method to calculate the numerical value of a polynomial function. Since many of the relations of scientific or industrial parameters given by mathematical formulae or numerical tables of empirical data can be represented with sufficient practical accuracy by polynomial expressions, this invention can be used in a broad field of scientific or industrial applications.

2. Description of the Prior Art

A function generator for polynomial functions comprising a cascade accumulator is described in my co-pending U.S. patent application Ser. No. 505,849 under amended title "Digital Function Generator Utilizing Cascade Accumulation", filed on Sept. 13, 1974.

FIG. 1 is a schematic block diagram of a cascade arrangement of memories M0, M1, M2, . . . M$n$ for illustrating the general principle of cascade accumulation, and FIG. 2 shows an illustrative form of cascade accumulator as shown in FIG. 8 of the above patent application Ser. No. 505,849, representing an embodiment of what is termed a second kind of cascade accumulator, as described in the specification of the above patent application. In the illustrative FIG. 2 embodiment, memories M0 to M4 are arranged in a shift register configuration, along with a delay circuit D and an adder A. Although only five memories M are shown for simplifying this explanation, ($n+1$) memories M may be employed.

To obtain the value of the function $w$ expressed by equation:

$$w = a_0 + a_1 x + a_2 x^2 + \ldots + a_n x^n \quad (1)$$

where:
- $w$ is the function, the value of which is to be obtained,
- $a_0, a_1, a_2, \ldots, a_n$ are constants,
- $x$ is the independent variable, and
- $n$ is an integer and $n \geq 2$, and for the simplified case of FIG. 2 where $n = 4$, the initial values to be loaded in the memories M0, M1, M2, M3 and M4 are given respectively by:

$$a'_0 = a_0 \quad (2)$$

$$a'_1 = a_1 + a_2 + a_3 + a_4 \quad (3)$$

$$a'_2 = 2a_2 + 6a_3 + 14a_4 \quad (4)$$

$$a'_3 = 6a_3 + 36a_4 \quad (5)$$

$$a'_4 = 24a_4 \quad (6)$$

As shown by FIG. 2, the memories M0, M1, . . . , M4 storing the values $a'_0, a'_1, \ldots, a'_4$ respectively as their initial values at $x=0$, are arranged in series to form a shift register. This shift register is read out and its output digits are supplied to a first input of the adder A and also to the input of a delay circuit D which delays the signals passing through it by an amount equivalent to the number of bits of each of the memories M0, M1, . . . , M4. The output from the delay circuit D is supplied to the other input of the adder A. The output from the adder A is rewritten in the shift register formed by the memories M0, M1, . . . , M4. By reading out the shift register contents and rewriting those contents back into the shift register once, one cycle of cascade additions is performed; by performing $x$ cycles of this operation, the value of the function $w$ is obtained in the memory M0. This prior art arrangement simplifies the construction of a function generator through the utilization of the technique of cascade accumulation, and serves to economize (i.e., reduce the cost of) the apparatus and improve its realibility as well.

SUMMARY OF THE INVENTION

The present invention is based on the discovery that by inverting the order in which the memories M0, M1, . . . , M4 are arranged in the above mentioned shift register, and by reading out the memory M0 first and M4 last, the manipulation for the second kind of cascade accumulation is still possible. This makes it possible to eliminate the delay circuit D in FIG. 2 resulting in a further simplification of the construction of the cascade accumulator, relatively to the prior art. In this invention only a register and an adder are used as the key elements of the cascade accumulator; the control circuit required is much the same as that of the prior art.

DETAILED DESCRIPTION OF THE INVENTION

The theoretical basis for the second kind of cascade accumulation is discussed in detail in the above mentioned patent application U.S. Ser. No. 505,849, and is now discussed briefly, to the extent here pertinent, to give a full understanding of the theory of the present invention, which also has its basis in the second kind of cascade accumulation.

Figure 1:
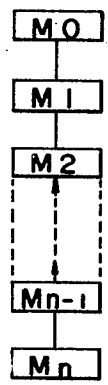
FIG. 1 is a block diagram for explanation of the principle of the cascade accumulation.

Referring to FIG. 1, in one cascade accumulative operation, the content of the memory M$i$ + 1, before having the content of the lower stage memory M$i$ + 2 added thereto, is added to the content of the upper stage memory M$i$. Where memories M0, M1, M2, M3, M4 are provided, and are loaded with initial values $a'_0, a'_1, a'_2, a'_3, a'_4$, respectively, and the above mentioned cascade accumulation of the second kind is repeated, then, the contents of the memories will be as shown in the following TABLE. In the Table, $x$ represents the number of times of cascade accumulations and the columns marked by M0, M1, M2, M3, M4 show the contents of those memories, corresponding to $x$. The content of M0, after $x$ times of cascade accumulations, is expressed by:

$$a'_0 + (a'_1 - \frac{1}{2}a'_2 + \frac{1}{3}a'_3 - \frac{1}{4}a'_4)x$$

$$+ (\frac{1}{2}a'_2 - \frac{1}{2}a'_3 + \frac{11}{24}a'_4)x^2$$

$$+ (\frac{1}{6}a'_3 - \frac{1}{4}a'_4)x^3 + \frac{1}{24}a'_4 x^4 \qquad (7)$$

Therefore, by setting values for $a'_0$ to $a'_4$ per equations (2) to (6), respectively, the value $w$ expressed by the equation (1) (i.e., with $n=4$) is obtained in the memory M0.

Figure 7:
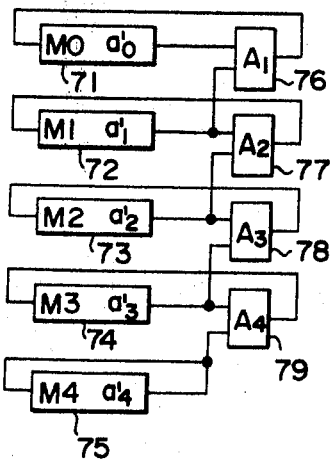
FIG. 7 is a cascade accumulator of the second type as shown in FIG. 7 of the noted copending application.

FIG. 7 shows an embodiment of the cascade accumulator of the second kind as taught in the referenced earlier application. M0, M1, M2, M3, M4 are memories and are loaded respectively with $a'_0, a'_1, a'_2, a'_3, a'_4$ as their initial values, as given by the foregoing equations (2), (3), (4), (5), and (6), respectively. $A_1$, $A_2$, $A_3$, $A_4$ are adders. The digits read out from the memories are applied to a first input of the corresponding adders, and the digits read out from the next lower stage memory are applied to the other inputs of the adders, respectively. The output of each adder is rewritten in the corresponding memory. The lowest stage memory is non-destructively read. It is obvious that by shifting all the memories simultaneously, one cascade accumulation of the second kind is performed.

tive number being represented by 2's complement and the sign bit. Although not limiting, the following description is given with the above arrangement.

Figure 3:
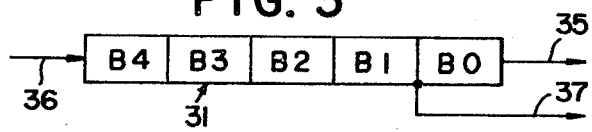
FIG. 3 is an illustrative block diagram of a shift register to be used in the present invention.
Figure 4:
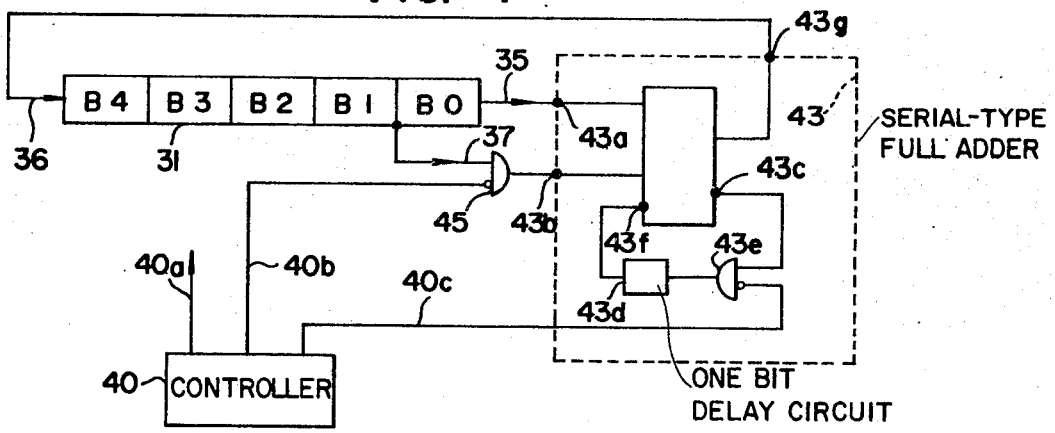
FIG. 4 is a circuit diagram, partially in block form, showing an embodiment of the present invention.

FIG. 4 shows an embodiment of this invention. In FIG. 4, elements 31, 35, 36, 37 are the same as the corresponding ones of FIG. 3; 40 is a controller and 40a is an output from controller 40 for supplying shift pulses to shift the information in the shift register 31 both for reading out and writing in operations, 40b and 40c are control signal outputs, 43 is a full adder of a serial type, 43a and 43b are the input terminals of the adder, 43g is the output terminal of the adder, 43c is the carry output terminal, 43f is the carry input terminal, 43d is a one bit delay circuit, 43e is a gate which inhibits the stray bit from the carry output terminal 43c to the one bit delay 43d when a control signal of 40c is applied, 45 is a gate which inhibits application of the signal from 37 to the serial adder input terminal 43b when a control signal 40b is applied to the gate 45.

Figure 5:
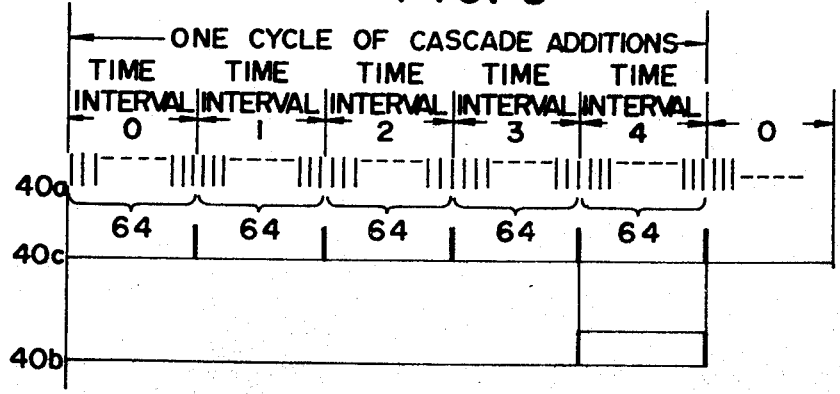
FIG. 5 is a timing chart for explaining the operation of the embodiment of the present invention shown in FIG. 4.

FIG. 5 is a time chart for explaining the operation of the cascade accumulator of FIG. 4. For the purpose of explanation, each block B0, B1, . . . of the shift register 31 has a 64 bit length, and for the generation of a fourth degree polynomial function, the period of one cycle of cascade additions is divided into $4 + 1 = 5$ time intervals as shown in FIG. 5. During each of the time intervals $0, 1, 2, \ldots$, the shift pulses 40a, 64 in number,

TABLE

| x | M0 | M1 | M2 | M3 | M4 |
|---|---|---|---|---|---|
| 0 | $a_0'$ | $a_1'$ | $a_2'$ | $a_3'$ | $a_4'$ |
| 1 | $a_0' + a_1'$ | $a_1' + a_2'$ | $a_2' + a_3'$ | $a_3' + a_4'$ | $a_4'$ |
| 2 | $a_0' + 2a_1' + a_2'$ | $a_1' + 2a_2' + a_3'$ | $a_2' + 2a_3' + a_4'$ | $a_3' + 2a_4'$ | $a_4'$ |
| 3 | $a_0' + 3a_1' + 3a_2' + a_3'$ | $a_1' + 3a_2' + 3a_3' + a_4'$ | $a_2' + 3a_3' + 3a_4'$ | $a_3' + 3a_4'$ | $a_4'$ |
| 4 | $a_0' + 4a_1' + 6a_2' + 4a_3' + a_4'$ | $a_1' + 4a_2' + 6a_3' + 4a_4'$ | $a_2' + 4a_3' + 6a_4'$ | $a_3' + 4a_4'$ | $a_4'$ |
| 5 | $a_0' + 5a_1' + 10a_2' + 10a_3' + 5a_4'$ | $a_1' + 5a_2' + 10a_3' + 10a_4'$ | $a_2' + 5a_3' + 10a_4'$ | $a_3' + 5a_4'$ | $a_4'$ |
| 6 | $a_0' + 6a_1' + 15a_2' + 20a_3' + 15a_4'$ | $a_1' + 6a_2' + 15a_3' + 20a_4'$ | $a_2' + 6a_3' + 15a_4'$ | $a_3' + 6a_4'$ | $a_4'$ |

Although the foregoing discussion as derived from the above patent application is made for the polynomial function of fourth degree, this is by no means limiting as to the scope of the present invention; as is well known in the art, one can easily derive the parameters necessary for the implementation of a cascade accumulator of a polynomial of any degree. For the purpose of explanation, the present application is also described for function generation of a fourth degree polynomial function.

FIG. 3 shows an example of a shift register 31 to be used for this invention. Shift register 31 is divided into five blocks of equal lengths B0, B1, B2, B3 and B4 and is shifted, illustratively to the right in the figure, by shift pulses. The contents of the shift register 31 are read out from the first output terminal as shown by the arrow 35, in the sequence of the block B0 first and the block B4 last. At the same time, the contents of the blocks B1, B2, B3 and B4 are read out from the second output terminal as shown by the arrow 37, in the sequence of the block B1 first and the block B4 last. Digital information is written into shift register 31 by being applied to its input terminal, as shown by the arrow 36. The blocks B0, B1, B2, . . . of the shift register 31 contain the information corresponding to that of the memories M0, M1, M2, . . . of FIG. 1, respectively. As is widely adopted in digital systems, the least significant digit may be located to the right and the most significant digit may be located to the left, and may represent the sign bit when a binary number system is used, a negaare applied to the shift register 31. During the time interval 0, the content of the block B0 is read out and led to the first input terminal 43a of the full adder 43, and simultaneously the content of the block B1 is shifted into the location of block B0 and also read out and led through the gate 45 to the other input terminal 43b of the full adder 43. Immediately after the 64 shift pulses are applied to the shift register 31, a control signal 40c is generated and applied to the inhibit terminal of the gate 43e, which inhibits the stray carry bit, which might be produced by the sign bits of the digital information stored respectively in the blocks B0 and B1 and thus appear at the carry output terminal 43c, from affecting the next information of the blocks B1 and B2 which is to be supplied to the input terminals of the full adder 43 at the beginning of the next time interval 1. The algebraic sum of the information stored in the blocks B0 and B1 appears at the output terminal 43g of the full adder 43, and is rewritten into the shift register 31 and is shifted to the location of block B0 at the end of the time interval 4, at which time $5 \times 64 = 320$ shift pulses have been applied. The control signal 40c is generated at the instant when the last shift pulse (i.e., the 64th shift pulse) in each of the time intervals 1, 2, . . . is over. As a result, the information stored in the blocks B1 and B2 is algebraically added by the full adder 43 and rewritten into the input stage B4 of the shift register 31 and then in the succeeding time intervals is shifted to the location of the block B1 when one cycle of cascade additions is completed, and so on with the following information in the other blocks. During the last time interval 4, a control signal 40b shown in FIG. 5 is generated and applied to the inhibit terminal of the gate 45 which inhibits the information shifted to the location of the block B1 at the end of the time interval 3, which represents the algebraic sum of the information initially stored in the blocks B0 and B1, from being supplied to the input terminal 43b of the full adder 43.

Figure 2:
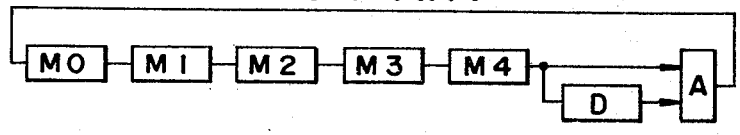
FIG. 2 is a circuit diagram of an embodiment of the second kind of cascade accumulator of the prior art.

Thus, it is clear that at the end of the time interval 4, one cycle of cascade additions of the second kind is performed, and by repeating the above operations a number of cycles corresponding to the value of the variable $x$, the value of the polynomial function $w$ of the equation (1) is obtained in the block B0. The shift register to be used in this invention may be of any kind, and it may be constructed as an integrated device or may be composed of chain of plural, independent memories as shown in FIG. 2.

Figure 6:
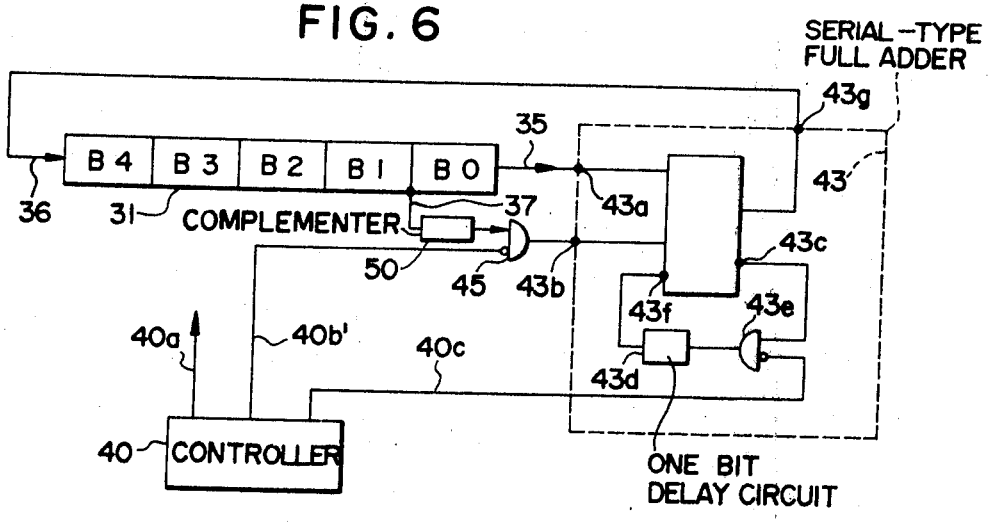
FIG. 6 is a circuit diagram, partially in block form, showing a complementary form of the embodiment of FIG. 4.

FIG. 6 is a block diagram of a complementary form of cascade accumulator as shown in FIG. 4, like elements being numbered correspondingly. A complementer 50 is connected in series with the gate 45 between the second output terminal 37 of the shift register 31 and the input terminal 43b of the full adder 43. The circuit shown in FIG. 6 thus performs the function of a complementary mode of the first kind of cascade accumulator as described in the above mentioned patent application Ser. No. 505,849 in connection with FIG. 6 thereof. Specifically, the circuit of FIG. 6 therefore can be used as a function generator for a decreasing value, independent variable $x$ in equation (1).

In accordance with the foregoing, it will be appreciated that the present invention affords an improved form of cascade accumulator of reduced complexity and cost, and of improved reliability. Numerous modifications and adaptations of the system of the invention will be apparent to those skilled in the art and thus it is intended by the appended claims to cover all such modifications and adaptations which fall within the true spirt and scope of the invention.

What is claimed is:

1. Apparatus for obtaining a digital value of a function expressed by:

$$w = a_0 + a_1x + a_2x^2 + \ldots + a_nx^n$$

where $w$ is the function the value of which is to be obtained, $a_0, a_1, a_2, \ldots, a_n$ are constants, $x$ is the independent variable, $n$ is an integer and $n \geq 2$, comprising:

a shift register means composed of blocks B0, B1, B2, ..., Bn having equal bit lengths of storage and arranged in the order of B0, B1, B2, ..., Bn and having first and second output terminals and an input terminal, means for loading each block of said shift register means with respective specific numerical value determined by the constants $a_0, a_1, a_2, \ldots, a_n$, control means for supplying shift pulses to said shift register blocks to shift the contents of said blocks of said shift register means, means for reading out serially the contents of said shift register means in response to said shift pulses in the order of B0, B1, B2, ..., Bn from said first output terminal, and, simultaneously, in the order of B1, B2, ..., Bn from said second output terminal of said shift register means, a serial full adder means having two input terminals and one output terminal, means for supplying said read out digits from said first output terminal of said shift register means to one of the input terminals of said full adder means, means for supplying said read out digits from said second output terminal of said shift register means to the other of the input terminals of said full adder means, means for supplying the digits from said output terminal of said full adder means to said input terminal of said shift register means to be rewritten therein, said control means, for performing one cycle of cascade additions, supplying a number of shift pulses selected in number in accordance with the number of storage bits of said blocks of said shift register means to shift the bits through all blocks of said shift register, said one cycle of cascade additions being divided into $n+1$ equal time intervals during each of which the bits of each block are shifted to the next successive block in said shift register means, means for interrupting the digits read out from said second output terminal of said shift register means to be supplied to the other input terminal of said full adder means during the last one of said time intervals, and said control means performing a number of cycles of cascade additions corresponding to the value of the independent variable $x$, thereby to obtain the value of the function $w$ in the block B0 of said shift register means.

2. Apparatus as claimed in claim 1, wherein said shift register means comprises a plurality of serial memory means connected in series, and said second output terminal of said shift register means comprises a series connection point of two successive said memory means.

3. Apparatus as claimed in claim 1, wherein said means for interrupting the digits read out from said second output terminal of said shift register means to be supplied to the other input terminal of said full adder means during the last one of said time intervals comprises a gate connected in series between said second output terminal of said shift register means and the other input terminal of said full adder means and having an inhibit terminal, said control means supplying an inhibit signal to said inhibit terminal during said last one of said time intervals.

4. Apparatus as claimed in claim 1, wherein said full adder means includes a carry output terminal and a carry input terminal, and further includes an inhibit gate having an inhibit terminal, said inhibit gate being connected in series between said carry output terminal and carry input terminal, and said control means applies an inhibit signal to said inhibit terminal between the last shift pulse of one of said time intervals and the first shift pulse of the succeeding time interval.

5. Apparatus as claimed in claim 1, wherein there is further included complementer means connected in series between said second output terminal of said shift register means and said other input terminal of said full adder means.

* * * * *